United States Patent [19]

Yamamoto

[11] 4,445,765
[45] May 1, 1984

[54] CAMERA INCORPORATING PHOTO-ELECTRO TRANSDUCER

[75] Inventor: Hiroshi Yamamoto, Kanagawa, Japan

[73] Assignee: Canon Kabushiki Kaisha, Tokyo, Japan

[21] Appl. No.: 411,909

[22] Filed: Aug. 26, 1982

[30] Foreign Application Priority Data

Sep. 4, 1981 [JP] Japan .................................. 56-131542

[51] Int. Cl.³ .................... G03B 7/00; G03B 13/02; G03B 17/00; G03B 19/12
[52] U.S. Cl. .................................. 354/478; 354/219; 354/288; 354/152
[58] Field of Search ...................... 354/23 R, 53–55, 354/59, 60 R, 152, 155, 219, 224, 225, 288

[56] References Cited

U.S. PATENT DOCUMENTS

| 4,247,600 | 1/1981 | Adachi | 354/288 X |
| 4,306,789 | 12/1981 | Yamamoto | 354/60 R |
| 4,341,448 | 7/1982 | Toyoda et al. | 354/59 |

FOREIGN PATENT DOCUMENTS 54-141121 11/1979 Japan .................................. 354/155

Primary Examiner—William B. Perkey
Attorney, Agent, or Firm—Toren, McGeady and Stanger

[57] ABSTRACT

In a camera incorporating a photo-electro transducer therein, the photo-electro transducer is protected from adverse effects of electromagnetic wave noises with parts of the camera around the transducer being electrically conductive. A frame which encompasses and carries the transducer is made of a conductive plastic material having carbon black mixed therein.

10 Claims, 2 Drawing Figures

CAMERA INCORPORATING PHOTO-ELECTRO TRANSDUCER

BACKGROUND OF THE INVENTION

1. Field of the Invention

This invention relates to the structure of a camera to prevent electromagnetic wave noises from affecting a photo-electro transducer which is disposed within the camera for receiving light.

2. Description of the Prior Art

Generally, a camera is provided with a photo-electro transducer for measuring the brightness of an object to be photographed. Especially in recent years, highly sensitive elements such as a silicon photo cell (SPC), a silicon photo diode (SPD), etc. have come to be used as photo-electro transducer. However, they are highly vulnerable to external electromagnetic wave noises. In the past, the body and other exterior parts of a camera were made of a metal material. Such a metal material served as a shield to protect the photo-electro transducer from the external electromagnetic wave noises. Therefore, the use of a photo-electro transducer in the past presented no problem in respect to the adverse effect of the external electromagnetic wave noises on the photo-electro transducer.

Meanwhile, the recent rapid advancement of plastic materials and the processing technique relative thereto has resulted in the use of them for camera bodies, exterior parts of cameras and other structural parts to a great extent for a reduction in the camera weight and cost. However, plastic materials for cameras are mostly an ABS resin, poly carbonate, etc. which have an electrical insulating property. Therefore, they are incapable of serving as a shield against external electromagnetic noises. The use of plastic materials thus greatly affects the accuracy of light measurement with external electromagnetic wave noises coming to the photo-electro transducer. However, conventional arrangement to have upper lid or the like of a camera which is made of an insulating plastic material plated with nickel, copper, chromium, etc. has somehow secured the shielding effect required.

Recent cost reduction efforts have brought forth a tendency to omit such plating. This tendency now presents a serious problem in respect to the adverse effects of external electromagnetic wave noises on the photo-electro transducer.

It is an object of the present invention to provide a camera incorporating a photo-electro transducer in which the members of the camera encompassing the photo-electro transducer are electrically conductive; and particularly, a support frame which accommodates and carries the transducer is made of a conductive plastic material formed with carbon black mixed therein to prevent external electromagnetic wave noises from affecting the photo-electro transducer, so that the camera has an accurately operating photo-electro transducer firmly arranged therein.

It is a second object of the invention to provide a camera having a photo-electro transducer in which the support frame is unified with a penta-prism box in such a way that variations in the mounting position of the photo-electro transducer are obviated; the support frame can be grounded without difficulty; and, in the manufacture of the camera, the assembly work can be simplified.

These and further objects and features of the invention will become apparent from the following detailed description of a preferred embodiment thereof taken in conjuction with the accompanying drawings.

SUMMARY OF THE INVENTION

The objects of the invention may be attained in a camera incorporating a photo-electro transducer therein which includes a photo-electric converting means for measuring the brightness of an object to be photographed, the means including at least the photo-electro transducer. A camera body may contain photo-electric converting means therein, the camera body including at least a part which is formed with an insulating synthetic resin material and which may be disposed in the vicinity of the photo-electric converting means. The apparatus may also include a shield member formed with an electrically conductive synthetic resin material, the shield member housing and carrying the photo-electric converting means.

DETAILED DESCRIPTION OF PREFERRED EMBODIMENT

Figure 1:
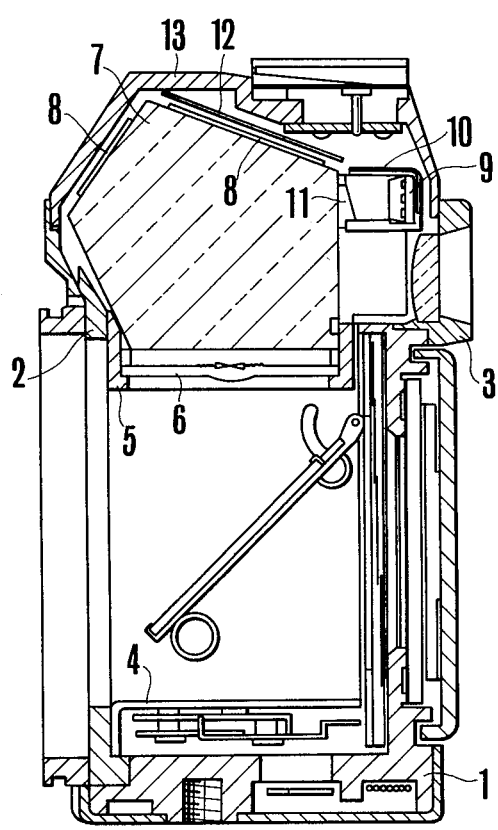
FIG. 1 is a sectional view taken across the middle of a camera in accordance with an embodiment of the invention.

A preferred embodiment of the present invention is as shown in the accompanying drawings. Referring first to FIG. 1, a camera body 1 has a front plate 2 attached thereto with screws. A view-finder eyepiece frame 3 is also attached to the camera body 1 with screws. A mirror box 4 is attached to the front plate 2. To the upper part of this mirror box 4 is attached a penta-prism box 5 with screws. Inside the penta-prism box 5, there are disposed optical members such as a focusing glass 6 and a penta-prism 7. This optical system is unified by pressing the penta-prism 7 downward and holding it in place with a penta-prism retainer 8. Furthermore, a photo-electro transducer 9 is disposed on the upper rear side of the penta-prism box 5 and is held in place by a metal piece 10. In front of the photo-electro transducer 9, a condenser Fresnel lens 11 is attached to one side of the penta-prism 7 and condenses rays of light coming from the penta-prism 7 on the photo-electro transducer 9. A flexible printed circuit board 12 is disposed on the upper surface of the penta-prism retainer 8. The upper side of the camera body 1 is covered by an upper cover 13 which is made from an insulating plastic material and which prevents dust, water and light from entering.

Figure 2:
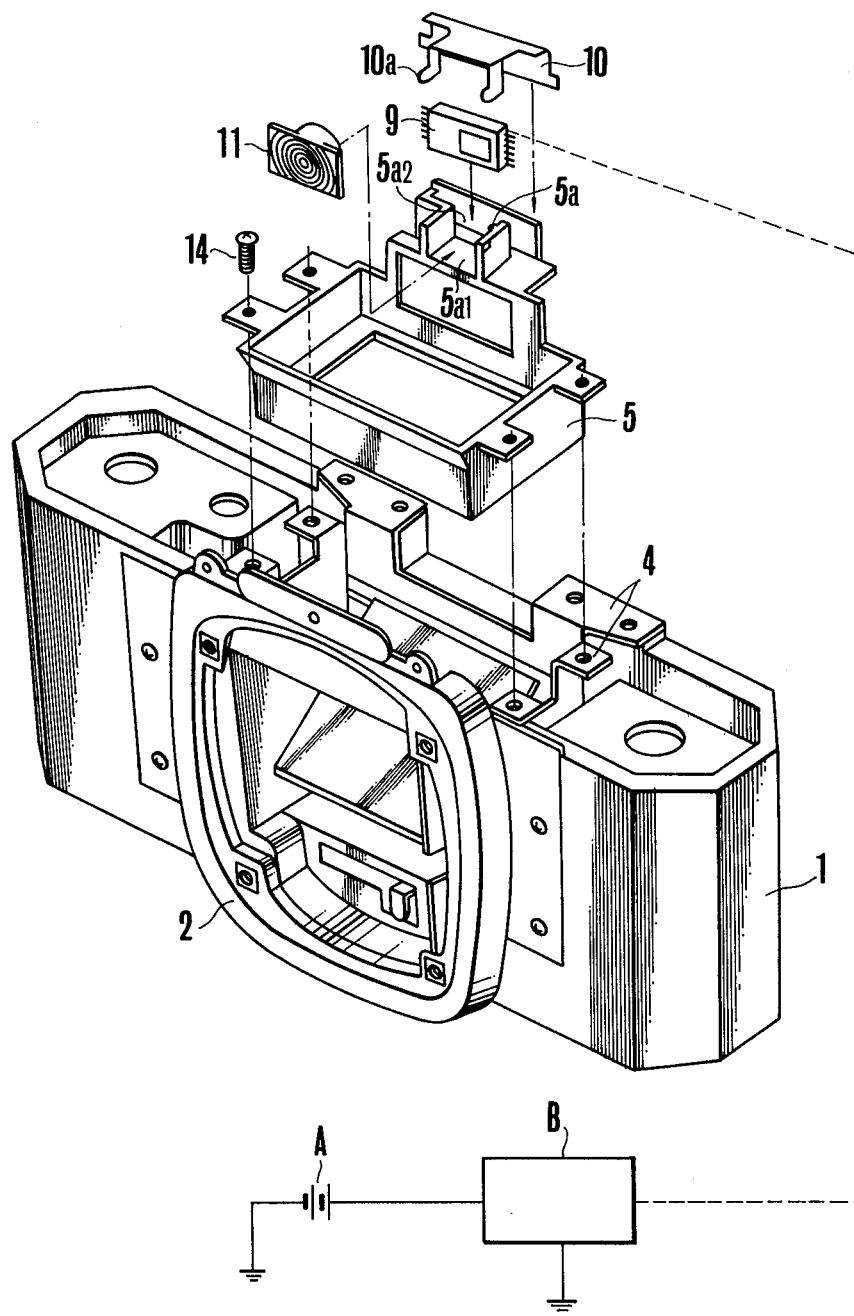
FIG. 2 is an oblique view showing the assembly arrangement of the embodiment shown in FIG. 1.

The assembly arrangement of the camera 1, shown in FIG. 1, is as shown in FIG. 2. The camera body 1 is made of a plastic material for the purpose of weight reduction and facilitates formation of a complex shape thereof. The camera body 1 is an insulator. The front plate 2 which is attached to the camera body 1 with screws is made of aluminum, zinc or the like selected in consideration of forces to be exerted thereon. Furthermore the mirror box 4, which is attached to the front plate 2, is made of a thin iron plate for effective utilization of limited available space. To the mirror box 4 is attached the penta-prism box 5 with screw 14. To prevent irregular reflection of light, the penta-prism box 5 is prepared in a black color. Since this penta-prism box is made of a plastic material which has a conductive carbon black mixed therein, it can be formed into a complex shape, permits weight reduction and it has electrical conductivity. On the upper rear side of this penta-prism box 5, there is provided a support frame 5a, which contains the photo-electro transducer 9 and is formed into one unified body with the penta-prism box 5, so that the position of the photo-electro transducer can be determined thereby. The support frame 5a is in a box-like shape and is open on the front and upper sides thereof. The condenser Fresnel lens 11 is stuck to the edge face of the open front side 5a1 of the support frame 5a while the open upper side 5a2 is covered with a resilient metal piece 10. The photo-electro transducer 9 is thus pushed downward within the support frame 5a by the metal piece 10. The end part 10a of the metal piece 10 engages the penta-prism box 5.

In the structural arrangement described above, the front plate 2, the mirror box 4, the penta-prism box 5 and the metal piece 10 respectively have electrical conductivity with a necessary interconnecting relation established between one unit and another. Since the photo-electro transducer 9 is surrounded by the support frame 5a of the penta-prism box 5 and the metal piece 10, the penta-prism box 5 is connected to an electrically low potential (ground) such as the negative side of a battery A through the front plate 2. This arrangement serves to subdue adverse effects of external electromagnetic wave noises inflicted on the photo-electro transducer 9. A reference symbol B denotes a control circuit, which is connected to a battery A and which controls the photo-electro transducer 9. Since a photo-taking lens is to be mounted on the camera, the front plate 2 and the mirror box 4 must have a sufficient degree of strength. Meanwhile, in accordance with the invention, the penta-prism box 5 and the support frame 5a which do not require any particular strength are formed into one unified body by a plastic material, so that they can be formed into a complex shape. This permits reduction in weight and cost. Furthermore, with the penta-prism box 5 and the support frame 5a in one unified body, the photo-electro transducer and a photometric optical system can be one unit. This arrangement not only advantageously prevents dust and moisture but also precludes variations and deviations in the mounting position of the photo-electro transducer. The unification arrangement also greatly facilitates grounding for a shield by interconnection between units. Furthermore, the arrangement having the conductive carbon black which is black, in color, mixed in the plastic material to render it conductive gives an advantage in blackening the color of the parts around the photo-electro transducer including the support frame 5a preventing an ambient reflection light incident on the photo-electro transducer. However, a metal powder of silver, aluminum, etc. may be mixed in the plastic material in place of the carbon black. In accordance with the invention, the effect of electrical conductivity can be obtained in sufficient degree for preventing the adverse effects of the electromagnetic wave noises when the carbon black content of the plastic material is 10 to 20%. Furthermore, in view of the higher cost of carbon black containing plastic material over ordinary plain plastic material, it may be not used for the camera body 1 and the upper cover 13 but may be used solely for the penta-prism box 5, which is of relatively small size.

As described in the foregoing, in accordance with the present invention, the electrically conductive carbon black is mixed in a plastic material which is advantageous in terms of cost, weight and workability; and the photo-electro transducer is encompassed and supported by this plastic material. Therefore, the invented arrangement not only permits utilization of the advantageous properties of the plastic material but also greatly subdues the adverse effects of external electromagnetic wave noises on the photo-electro transducer. The invention, therefore, has great advantages.

What I claim:

1. A camera incorporating a photo-electro transducer therein, comprising:

photo-electric converting means for measuring the brightness of an object to be photographed, said means including at least said photo-electro transducer;

a camera body containing said photo-electric converting means therein, said camera body including at least a part which is formed with an insulating synthetic resin material and is disposed in the vicinity of the photo-electric converting means; and a shield member formed with an electrically conductive synthetic resin material, said shield member being arranged to house and/or carry said photo-electric converting means.

2. A camera according to claim 1, further including a grounding member for grounding said shield member.

3. A camera according to claim 2, wherein said shield member is made of an insulating synthetic resin material prepared with electrically conductive carbon black mixed therein.

4. A camera incorporating a photo-electro transducer, comprising:

photo-electric converting means for measuring the brightness of an object to be photographed, said means including at least said photo-electro transducer;

a penta-prism;

a penta-prism box arranged to carry said penta-prism, said penta-prism box being formed with a synthetic resin material; and a shield member which is formed into one body with said penta-prism box and is arranged to house said photo-electric converting means therein, said shield member being formed with an electrically conductive synthetic resin material.

5. A camera according to claim 4, further including a grounding member for grounding said shield member.

6. A camera according to claim 5, wherein said shield member is made of an insulating synthetic resin material which is prepared with electrically conductive carbon black mixed therein.

7. A camera incorporating a photo-electro transducer, comprising:

a camera body having at least upper part thereof made of an electrically insulating plastic material;

a metallic front plate secured to the front part of said camera body;

a metallic mirror box which is attached to said front plate;

a penta-prism disposed within the upper part of said camera body;

a penta-prism box which is arranged to carry said penta-prism and is attached to said mirror box, said penta-prism box being formed with a plastic material prepared with electrically conductive carbon black mixed therein;

photo-electric converting means for measuring the brightness of an object to be photographed, said photo-electric converting means including at least said photo-electro transducer; and a shield member formed into one body with said penta-prism box, said shield member being arranged to house and carry said photo-electric converting means at the upper rear side of said penta-prism box, said shield member being formed with the same material as that of said penta-prism box.

8. A camera according to claim 7, further including an enclosing member which encompasses said photo-electric converting means in conjunction with said shield member.

9. A camera according to claim 8, wherein said enclosing member is made of a metal material.

10. A camera according to claim 8, wherein said penta-prism box and said shield member are arranged in a black color.

* * * * *